(12) United States Patent
Narayanan et al.

(10) Patent No.: US 9,652,253 B2
(45) Date of Patent: May 16, 2017

(54) FIELD REPLACEABLE UNIT AUTHENTICATION SYSTEM

(71) Applicant: Dell Products L.P., Round Rock, TX (US)

(72) Inventors: Padmanabhan Narayanan, Tamilnadu (IN); Rajasekhar Pulluru, Tamilnadu (IN)

(73) Assignee: Dell Products L.P., Round Rock, TX (US)

( * ) Notice: Subject to any disclaimer, the term of this patent is extended or adjusted under 35 U.S.C. 154(b) by 58 days.

(21) Appl. No.: 14/856,231

(22) Filed: Sep. 16, 2015

(65) Prior Publication Data

US 2017/0075699 A1    Mar. 16, 2017

(51) Int. Cl.

| G06F 9/00 | (2006.01) |
|---|---|
| H04L 9/00 | (2006.01) |
| G06F 9/44 | (2006.01) |
| H04L 9/14 | (2006.01) |
| H04L 29/06 | (2006.01) |

(52) U.S. Cl.
CPC ............ *G06F 9/4416* (2013.01); *H04L 9/006* (2013.01); *H04L 9/14* (2013.01); *H04L 63/06* (2013.01)

(58) Field of Classification Search
CPC ......... G06F 9/4416; H04L 9/006; H04L 9/14; H04L 63/06
See application file for complete search history.

(56) References Cited

U.S. PATENT DOCUMENTS

| 8,245,053 | B2 * | 8/2012 | Hoang | G06F 21/575 713/189 |
|---|---|---|---|---|
| 8,670,568 | B2 * | 3/2014 | Ibrahim | G06F 21/572 380/277 |
| 8,726,364 | B2 * | 5/2014 | Smith | G06F 21/575 711/163 |
| 2006/0026418 | A1 * | 2/2006 | Bade | G06F 21/57 713/150 |
| 2006/0107054 | A1 * | 5/2006 | Young | G06F 21/572 713/176 |
| 2014/0281574 | A1 * | 9/2014 | Webb | G06F 21/74 713/189 |

* cited by examiner

*Primary Examiner* — Mark Connolly
(74) *Attorney, Agent, or Firm* — Haynes and Boone, LLP (57) ABSTRACT

A field replaceable unit authentication system provides for a field replaceable unit device to be positioned in a chassis. A trusted platform module is included in the field replaceable unit device. A network operating system engine may be provided in the field replaceable unit device and coupled to the trusted platform module. The network operating system engine participates in a boot process with a booting subsystem to generate current boot metric data that is provided for storage in the trusted platform module. A platform management controller in the field replaceable unit device retrieves the current boot metric data from the trusted platform module, authenticates the trusted platform module, and compares the current boot metric data to previously stored boot metric data to determine whether to authenticate the network operating system engine. If authenticated, the network operating system engine then authenticates the platform management controller.

20 Claims, 8 Drawing Sheets

FIELD REPLACEABLE UNIT AUTHENTICATION SYSTEM

BACKGROUND

The present disclosure relates generally to information handling systems, and more particularly to a hardware authentication system for a field replaceable unit in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The hardware authentication of information handling systems such as, for example, servers, switches, storage device, and/or other computing devices known in the art, is typically performed over a network by an authentication server using authentication software and/or hardware dongles. In many situations, authentication servers and/or the authentication software they use may be compromised, which can allow unauthorized/spurious devices and/or subsystems to be utilized with the computing devices and/or in the network.

Accordingly, it would be desirable to provide an improved authentication system.

SUMMARY

According to one embodiment, an information handling system (IHS) includes a booting subsystem; a trusted platform module that is coupled to the booting subsystem and that is configured to couple to a network operating system engine, wherein the trusted platform module is configured to receive and store current boot metric data that is generated when the booting subsystem and the network operating system engine perform a boot process; and a platform management controller that is coupled to the trusted platform module, wherein the platform management controller is configured to retrieve the current boot metric data from the trusted platform module in response to the booting subsystem and the network operating system engine performing the boot process, authenticate the trusted platform module, and compare the current boot metric data to previously stored boot metric data to determine whether to authenticate the network operating system engine.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
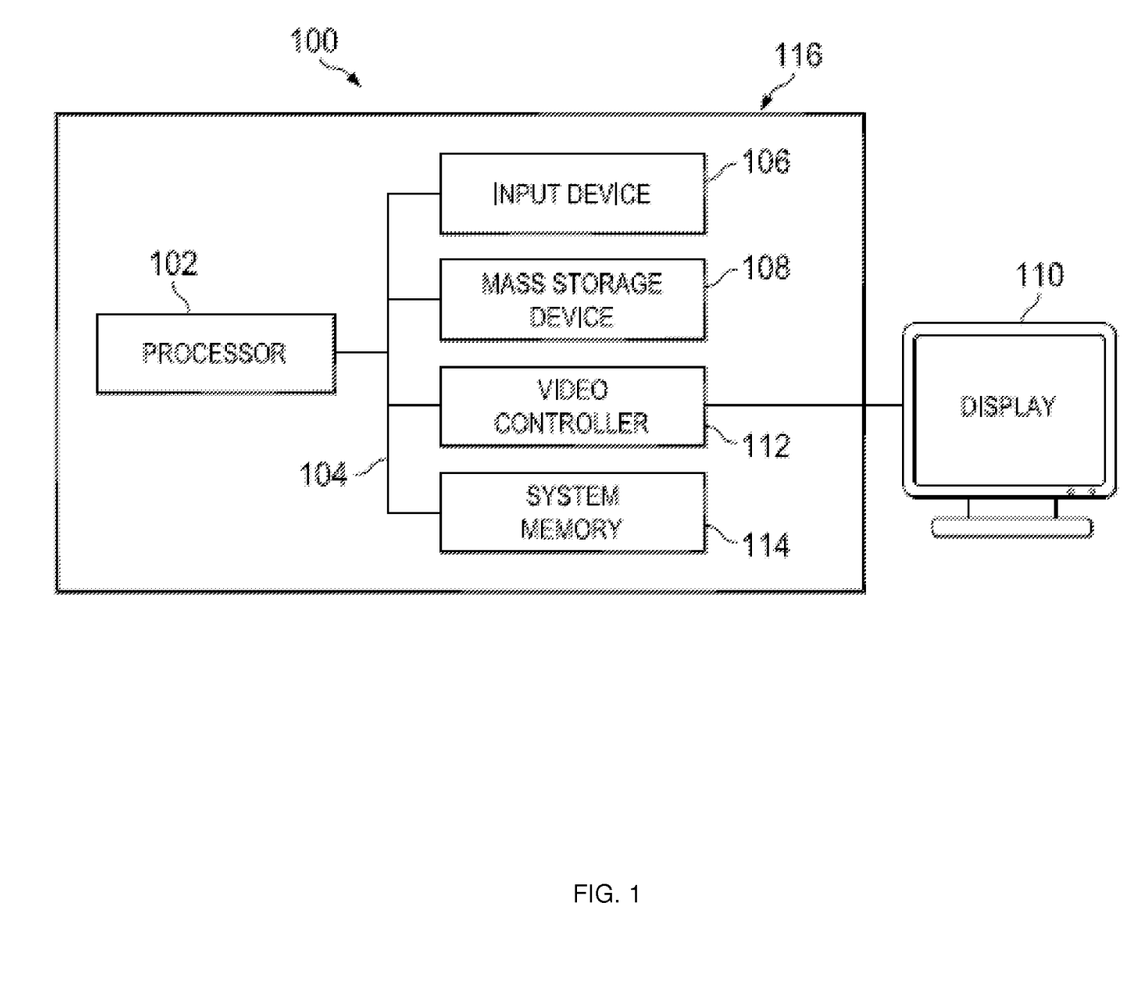
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
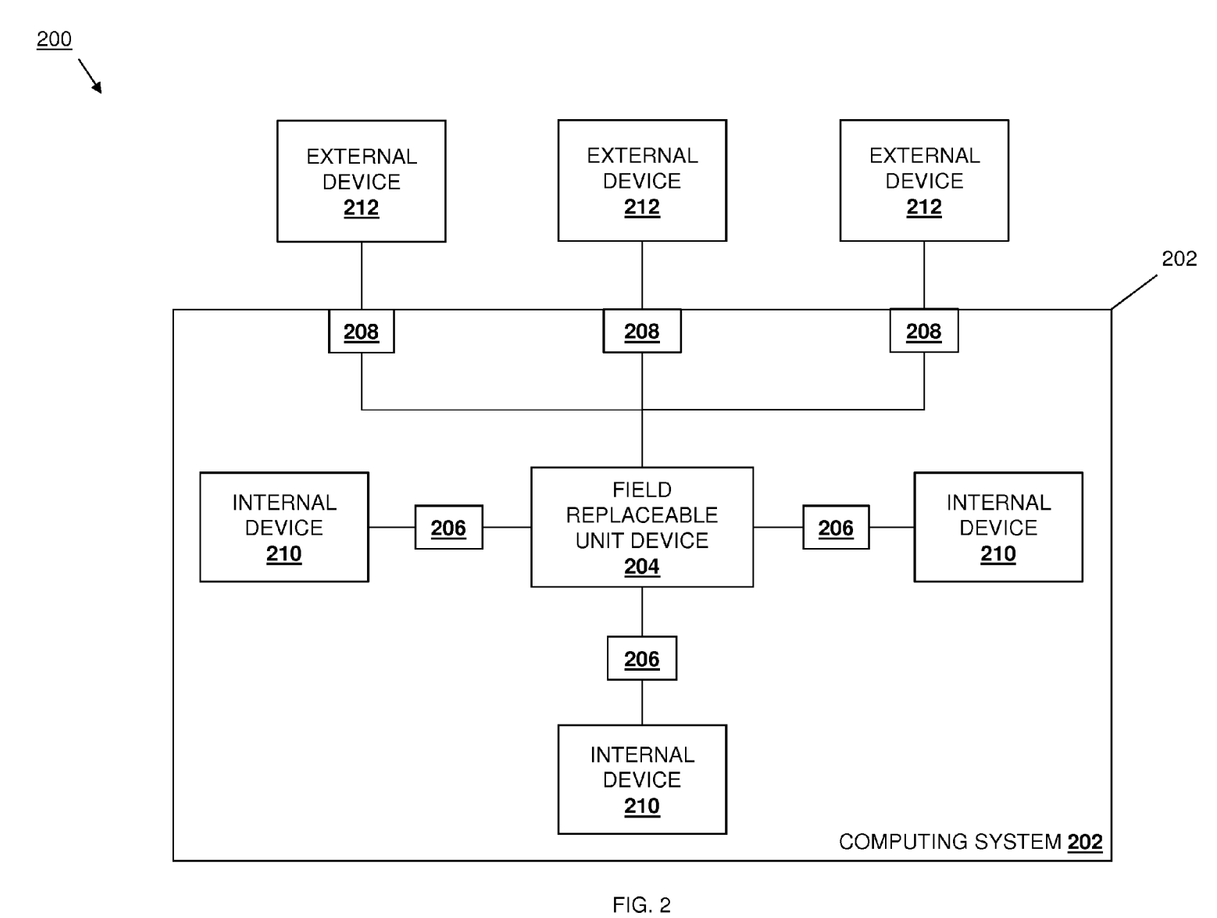
FIG. 2 is a schematic view illustrating an embodiment of a field replaceable unit authentication system.

Referring now to FIG. 2, an embodiment of a field replaceable unit authentication system 200 is illustrated. While the discussion below is directed to embodiments that provide for authentication within and between field replaceable unit devices, the teaching of the present disclosure may be utilized in providing authentication within and between other devices and/or subsystems known in the art. As such, the discussion involving the field replaceable unit device(s) below may be applied to the IHS 100 discussed above with reference to FIG. 1 and/or to IHS components in the IHS 100 while remaining within the scope of the present disclosure. The field replaceable unit authentication system 200 includes a computing system 202 that may be the IHS 100 discussed above with reference to FIG. 1 and/or some or all of the components of the IHS 100. In specific embodiments discussed below, the computing system 202 is illustrated and described as a switch, but a variety of other devices such as servers, storage devices, desktop computers, laptop computers, tablet computers, mobile phones, and/or other computing systems known in the art will fall within the scope of the present disclosure. The computing system 202 includes a chassis 202a that houses the components of the computing system 202, only some of which are illustrated in FIG. 2.

In the illustrated embodiment, the chassis houses a field replaceable unit (FRU) device 204. In an embodiment, the FRU device 204 may be a circuit board, part, and/or assembly that is quickly connectable to and removable from the computing system 202 or other electronic component such that, for example, it may be quickly and easily replaced with another FRU device. In an embodiment, the FRU device 204 may be the IHS 100 discussed above with reference to FIG. 1 and/or include some or all of the IHS components. In some specific embodiments discussed below, the FRU device is a route processor module and/or a line module in a switch, but other FRU devices, non-FRU devices, and/or subsystems will benefits from the teachings of the present disclosure and thus fall within its scope. The FRU device 204 is coupled to a plurality of internal device connectors 206 that are housed in and accessible within the chassis 202, and a plurality of external device connectors 208 that are housed in and accessible on an outer surface of the chassis 202. For example, the FRU device 204 may be connected to a circuit board that provides the plurality of internal device connectors 206 and the plurality of external device connectors 208 on that circuit board and/or through cabling connected to that circuit board, and the FRU device 300 may be connected to the internal device connectors 206 and the external device connectors 208 through traces in the circuit board and/or cabling. However, other couplings to the connectors (e.g., cabling directly coupled to the FRU device 204) is envisioned as falling within the scope of the present disclosure.

In the illustrated embodiment, the chassis 202 houses a plurality of internal devices 210 that are each connected to a respective one of the internal device connectors 206, and a plurality of external devices 212 that are each connected to a respective one of the external device connectors 208. Any of all of the internal devices 210 and the external devices 212 may be the IHS 100 discussed above with reference to FIG. 1 and/or include some or all of the IHS components. In different embodiments, any or all of the internal devices 210 and external devices 212 may be FRU devices that may operate according to the methods discussed below. In specific embodiments discussed below, the internal devices 210 are described as line modules that are provided in a switch, but a variety of other devices are envisioned as falling within the scope of the present disclosure. Furthermore, as discussed below, additional devices may be coupled to the internal devices 210 and/or external devices 212 and authenticated as discussed below while remaining within the scope of the present disclosure.

Figure 3:
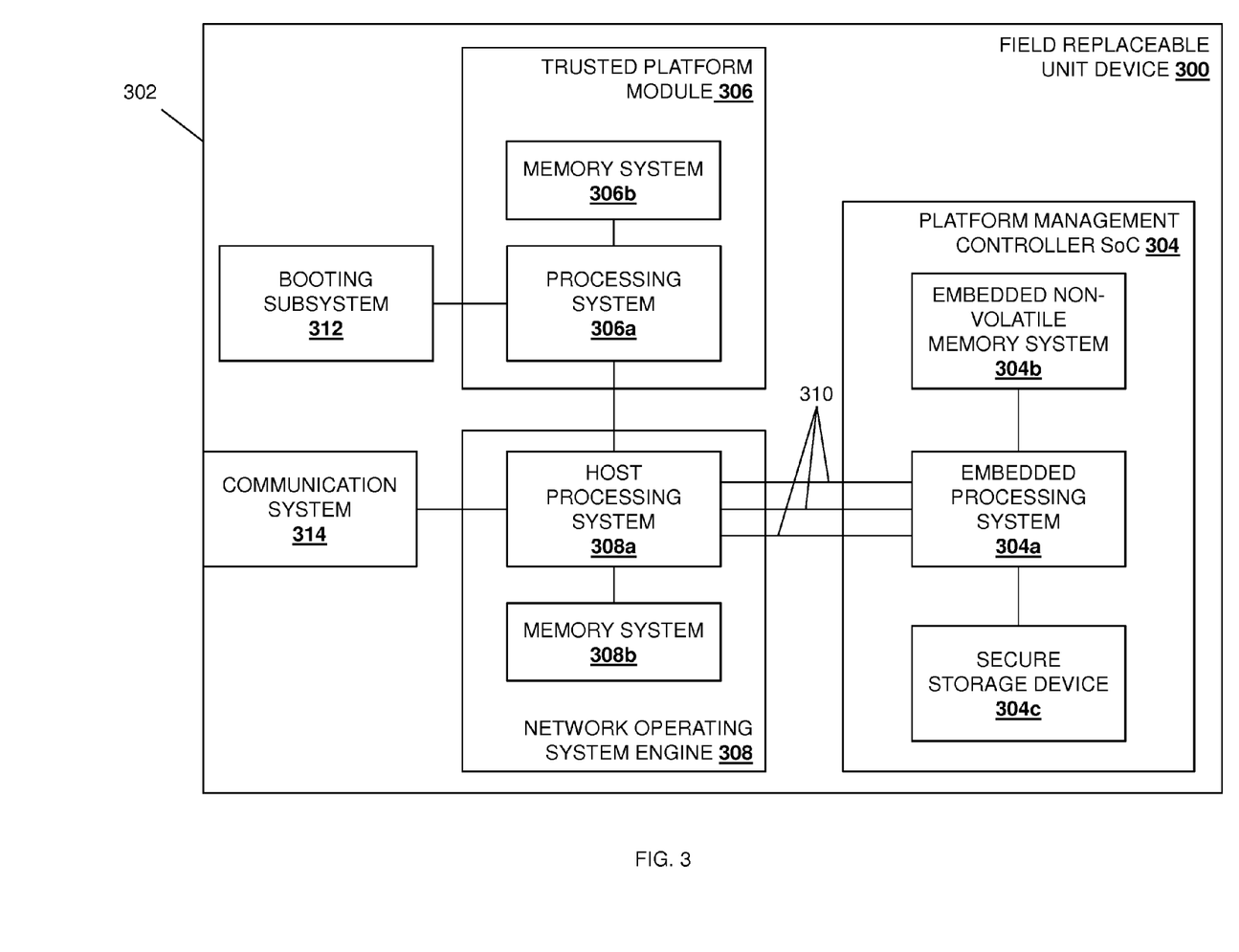
FIG. 3 is a schematic view illustrating an embodiment of a field replaceable unit device in the field replaceable unit authentication system of FIG. 2.

Referring now to FIG. 3, an embodiment of a field replaceable unit (FRU) device 300 is illustrated. In an embodiment, the FRU device 300 may be the FRU device 204 of FIG. 2. As such, the FRU device 300 may be the IHS 100 discussed above with reference to FIG. 1, and/or may include some or all of the components of the IHS 100. The FRU device 300 includes a chassis 302 that, in the embodiments described below, is a circuit board that supports or provides each of the components of the FRU 300. However, other chassis are envisioned as falling within the scope of the present disclosure. In the illustrated embodiment, the chassis 302 supports a platform management controller System on a Chip (SoC) 304 and a trusted platform module 306 that are each coupled to a network operating system engine 308. As discussed below, the different components of the FRU device 300 may be provided by different manufacturers, vendors, and/or component providers, and those components may be provided with a variety of authentication information (some of which is discussed below) that allows for their verification/authentication. While specific features of the FRU device 300 are illustrated in FIG. 3 and described below, one of skill in the art in possession of the present disclosure will recognize that the FRU device 300 may include a variety of other components while remaining within the scope of the present disclosure.

In an embodiment, the platform management controller SoC 304 is provided by an integrated circuit that integrates all of the components of a platform management controller into a single chip that may include digital, analog, mixed-signal, and/or radio frequency functions on a single chip substrate. However, while the platform management controller functionality is illustrated as provided as an SoC, other components, devices, and/or subsystems may provide the platform management controller while remaining within the scope of the present disclosure. The platform management controller SoC 304 includes an embedded processing system 304a that is coupled to each of an embedded non-volatile memory system 304b and a secure storage device 304c. In an embodiment, the secure storage device 304c may be provided using CONTROLVAULT™ available from the assignee of the present disclosure, DELL® Inc. of Round Rock, Tex. However, other secure storage devices will fall within the scope of the present disclosure. In addition to the illustrated components, the platform management controller SoC 304 may be coupled to, include, and/or otherwise provide a Field Programmable Gate Arrays (FPGA), FPGA tiles, programmable Input/Outputs (I/O's), PHYs, and/or other platform management controller elements known in the art that are not illustrated for clarity. In an embodiment, the embedded processing system 304a may include a multi-core processor that runs a general purpose operating system for providing the functionality discussed below. As discussed below, in some embodiments, the platform management controller SoC 304 may be provided by a SoC manufacturer and/or vendor to an Original Equipment Manufacturer (OEM) (e.g., the assignee of the present disclosure, DELL® Inc. of Round Rock, Tex.) that manufactures or otherwise provides the FRU device 300 to users/customers, and thus may include authentication information that allows for its verification.

In an embodiment, the trusted platform module 306 includes a processing system 306a that is coupled to a memory system 306b. In an embodiment, the processing system 306a in the trusted platform module 306 may include a dedicated, secure cyptoprocessor that is configured to secure hardware by integrating cryptographic keys into that hardware. However, other trusted platform module components will fall within the scope of the present disclosure. As discussed below, in some embodiments, the trusted platform module 306 may be provided by a trusted platform module manufacturer and/or vendor to an OEM that manufactures or otherwise provides the FRU device 300, and thus may include authentication information that allows for its verification.

In an embodiment, the network operating system engine 308 includes a host processing system 308a that is coupled to a memory system 308b that includes instructions that, when executed by the host processing system 308a, cause the host processing system to provide the network operating system engine 308 that is configured to provide a network operating system and/or perform the functions of the network operating system engines discussed below. As discussed in further detail below, the host processing system 308a may be utilized to run a network operating system that may be provided by a networking operating system provider, the OEM, a user of the FRU device 300, and/or some other third party. In some embodiments, the host processor 308a may be a central processing unit (CPU) SoC in the FRU device 300 that typically provides for control plane functionality and that is utilized in the field replaceable unit authentication system to program a network processing unit (NPU) SoC that provides a Media Access Control (MAC)/PHY data-plane complex. However, in some embodiments, the host processing system 308a may be an embedded processor in an NPU SoC in the FRU device 300. The network operating system engine 308 is coupled to the platform management controller SoC 304 via a plurality of connections 310 that may include a power connection, a Network Controller Sideband Interface (NC-SI) connection, a Local Procedure Call (LPC) connection, a Management Data Input/Output (MDIO) connection, and/or other connections known in the art. While the connections 310 are illustrated as being between the host processing system 308a in the network operating system engine 308 and the embedded processing system 304a in the platform management controller SoC 304, those connections may be provided between different components in the network operating system engine 308 and the platform management controller SoC 304 (e.g., multiplexers, PHYs, etc.) while remaining within the scope of the present disclosure. As discussed below, in some embodiments, the network operating system engine 308 may be provided by n network operating system manufacturer and/or vendor to an OEM that manufactures or otherwise provides the FRU device 300, and thus may include authentication information that allows for its verification. However, in some embodiments the network operating system engine 308 may be provided by the OEM.

A booting subsystem 312 is provided on the FRU device 300 and coupled to the processing system 306a in the trusted platform module 306. In an embodiment, the booting system 312 may be provided by a Basic Input/Output System (BIOS), a Unified Extensible Firmware Interface (UEFI), a boot loader such as an Open Network Install Environment (ONIE), and/or other booting subsystem components known in the art. A communication system 314 is provided on the FRU device 300 and coupled to the host processing system 308a in the network operating system engine 308. In an embodiment, the communication system 314 may include a variety of different components that provide the coupling of the FRU device 300 to devices connectors and/or other devices (e.g., the internal connectors 206 and/or internal devices 210, the external connectors 208 and/or external devices 212, etc.) In specific embodiments discussed below, the FRU device 300 is described as a route processor module or a line module in a switch and, as such, one of skill in the art in possession of the present disclosure will recognize that the FRU device 300 may include a variety of different components (not illustrated for clarify) for enabling the functionality of those modules while remaining within the scope of the present disclosure.

Figure 4:
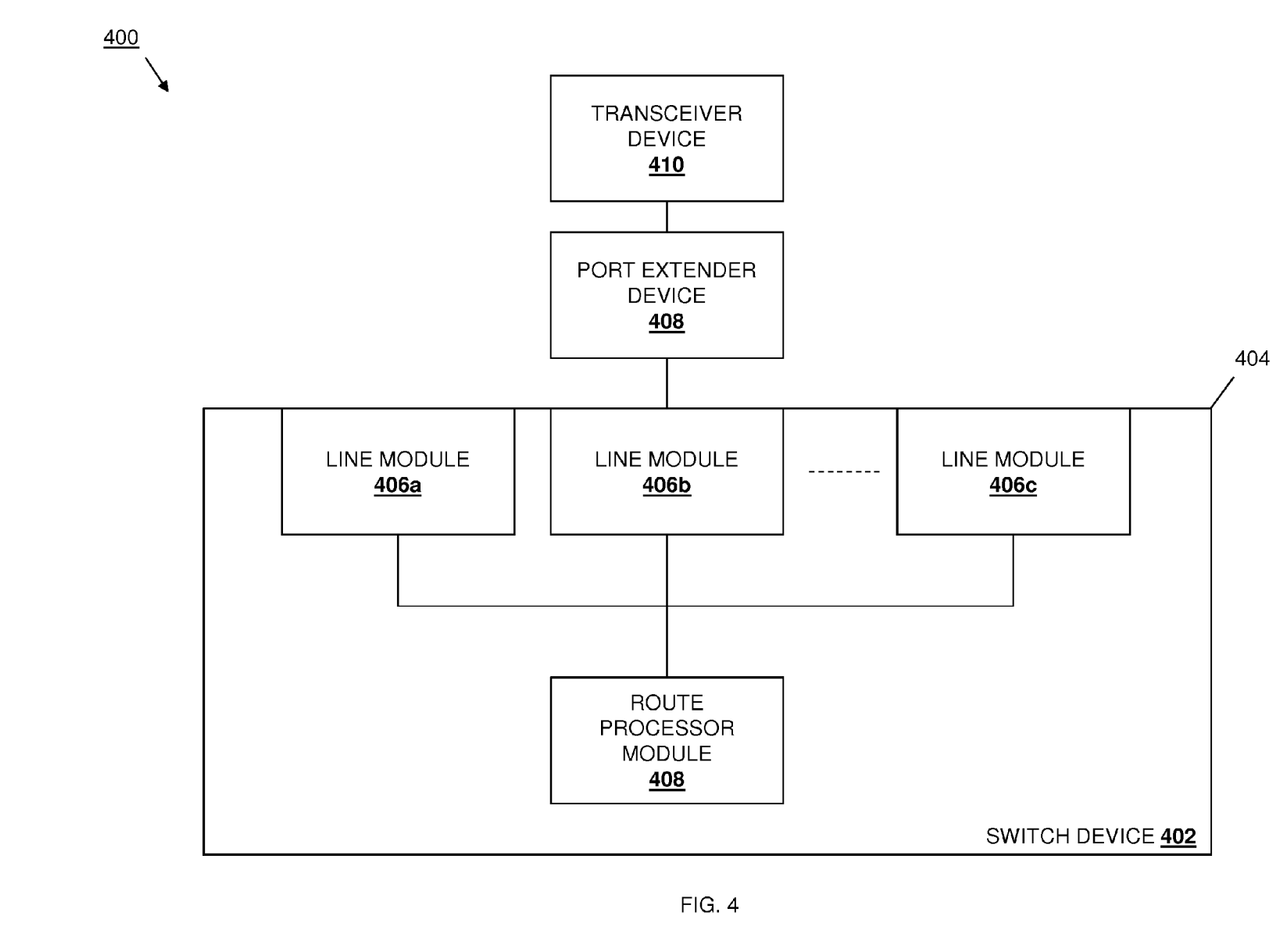
FIG. 4 is a schematic view illustrating an embodiment of a field replaceable unit authentication system provided with a switch device.

Referring now to FIG. 4, a specific embodiment of a field replaceable unit authentication system is illustrated as implemented in a network switching system 400. The network switching system 400 includes a switch device 402 having a chassis 404 that houses a route processor module 408 that is coupled to a plurality of line modules 406a, 406b, and up to 406c. Any of the line modules 406 may be coupled to one or more external devices, as illustrated for the line module 406b coupled to the port extender device 408 that is further coupled to the transceiver device 410. In the examples provided below, the route processor module 408 is described as the FRU device 300 of FIG. 3 that performs the authentication discussed below while also being configured to authenticate the line modules 406a-c, port extender device 408, the transceiver device 410, and/or any other devices coupled to the route processor module 408. However, other devices (e.g., any of the line modules 406a-c) may operate as the FRU device 300 in the manner described below while remaining within the scope of the present disclosure.

Figure 5:
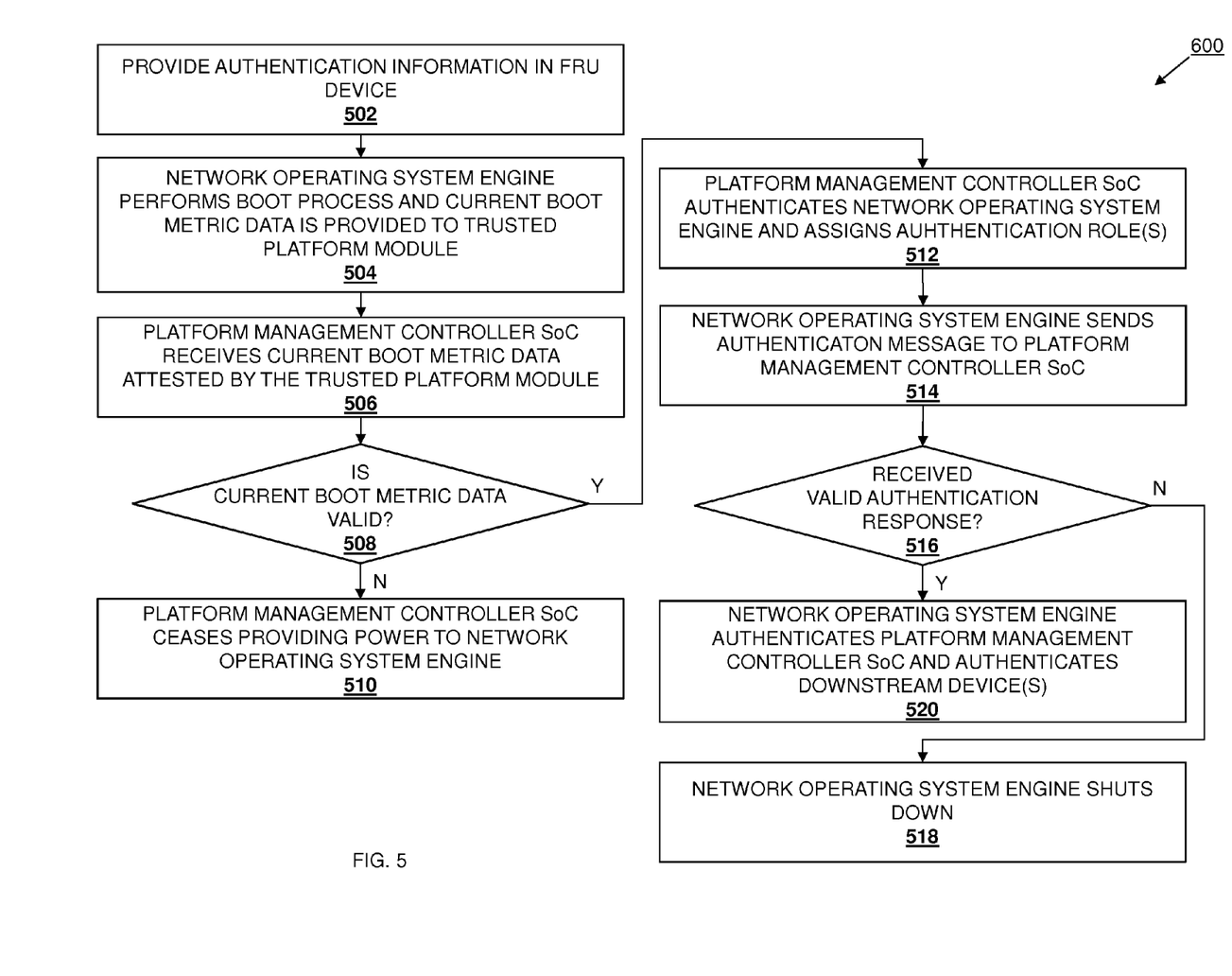
FIG. 5 is a flow chart illustrating an embodiment of a method for providing authentication in a field replaceable unit device.

Referring now to FIG. 5, an embodiment of a method 500 for providing authentication in a field replaceable unit is illustrated. In specific embodiments, the systems and methods of the present disclosure may allow an OEM (e.g., DELL®, Inc. of Round Rock, Tex.) to provide "open" networking switches that decouple the software/hardware interlocks for a datacenter, which allows for the running of an OEM operating system, a third party operating system, and/or other operating systems on the network switch that allow users of the switch to focus on applications (e.g., Software Defined Networking (SDN) applications that deal primarily with the control of NPU elements) while leaving the platform management aspects to the OEM. In such embodiments, the OEM may "own" the platform management controller and associated platform management software on the switch, while the user has the option of running a network operating system of their choice (e.g., a network operating system from the OEM or from a network operating system vendor, a customized network operating system provided by the user, etc.). That network operating system may then be run using the host processor in the switch, and allows opportunities such as the design of "build-your-own-device" systems such as port extender devices.

However, along with such benefits, such systems provide opportunities for the creation of counterfeit hardware, which may be enabled by a user removing the platform management controller from the switch or providing an unauthorized network operating system on the switch. As such, the systems and methods of the present disclosure may be provided to authenticate hardware (e.g., by detecting and isolating/shutting down unauthorized/spurious hardware) in scenarios such as, for example, line module authentication by a route processor module, port extender authentication by a line module and/or controlling bridge/uplink module, transceiver authentication by a line module and/or port extender, line card (leaf) authentication by a spine, and/or a variety of other hardware authentication scenarios known in the art.

In some of the embodiments discussed below, the hardware authentication performed by the systems and methods of the present disclosure is referred to below as "802.1X$^{HW}$" hardware authentication, and is distinguishable from 802.1X device authentication as defined by the Institute of Electrical and Electronics Engineers (IEEE) in that it provides for the detection of unauthorized/spurious hardware rather than posture assessments of devices to determine whether those devices can safely and legitimately join a network topology. As such, one of skill in the art in possession of the present disclosure will recognize that the 802.1X$^{HW}$ hardware authentication described herein provides a novel hardware detection mechanism to determine whether hardware is authentic/authorized.

Conventional hardware authentication systems operate in a number of manners. For example, illegal/unauthorized hardware may be countered using trusted platform module based solutions that use the IEEE 802.1AR framework for authenticating counterfeit hardware with 802.1X/Extensible Authentication Protocol-Transport Layer Security (EAP-TLS) like authentication options. In another example, some hardware authentication implementations build a trusted network of 802.1X authenticated devices based on IEEE 802.1AE (also known as MACSec). In yet another example, spurious host processor/network processing unit checks may be performed based on conventional secure boot mechanisms. These and other conventional hardware authentication systems suffer from a variety of limitations. For example, such conventional authentication systems use mechanisms or software entities that are themselves authenticated by authorized/genuine software, and thus authenticate hardware based on software entities. In such examples, the authenticator may be a network device that is authenticated by a software entity such as a centralized authentication server, and software components in those devices may be compromised to disregard fundamental authentication criteria and allow unauthorized/spurious hardware. In other examples, centralized software/certificate based device authentication is used to provide for network admission control, but cannot provide hardware authentication.

As discussed below, specific embodiments of the present disclosure utilize recent strides in platform management controller SoC designs and evolution to provide a variety of security features that enable the authentication systems and methods of the present disclosure. For example, binaries running on FPGAs and the embedded processing system 304a in the platform management controller SoC 304 may be utilized and/or upgraded using an external programmer and/or the host processing system 308a without compromising the platform management controller SoC 304. In another example, tamper resistant features may ensure the integrity of code and private keys stored on the platform management controller SoC 304, while the embedded non-volatile memory system 304b in the platform management controller SoC 304 allows for the exporting of keys and/or other entities (e.g., using Application Programming Interfaces (APIs)) based on a request from the host processing system 308a without compromising the keys in the secure storage device 304c on the platform management controller SoC 304.

In yet another example, a vendor of the platform management controller SoC 304 can create and inject a platform management controller SoC public key ("SoC public key") and a platform management controller SoC private key ("SoC private key") that is paired with the SoC public key such that the SoC public/private key pair is unique to the platform management controller SoC 304, as well as sign the SoC public key with a platform management controller SoC vendor private key ("PMC private key") to create a certificate (e.g., an X.509 certificate indicated below by X.509 (PMC private key {SoC public key})) that may be stored in the embedded non-volatile memory system 304b of the platform management controller SoC 304 and used (e.g., by the OEM) to verify that the platform management controller SoC 304 is manufactured/provided by a particular platform management controller SoC vendor. In yet another example, once the platform management controller SoC 304 is in control of the OEM, private/public key pairs may be generated internally in the platform management controller SoC 304 using a physically uncloneable function (PUF) such that private keys cannot be exported out of the secure storage device 304c in the platform management controller SoC 304. In a specific embodiment, the platform management controller SoC 304 may access a management port on the host processing system 308a using NC-SI and a lightweight Redfish application (provided by the DISTRIBUTED MANAGEMENT TASK FORCE®, Inc.) to scan OEM hardware in a networked system; administer signed keys into the embedded non-volatile memory system 304b of the platform management controller SoC 304, the memory system 306b of the trusted platform module 306, and the memory system 308b of the network operating system engine 308; and configure 801.1X$^{HW}$ parameters such as, for example, the Internet Protocol (IP) address of an inline authentication server.

Figure 6:
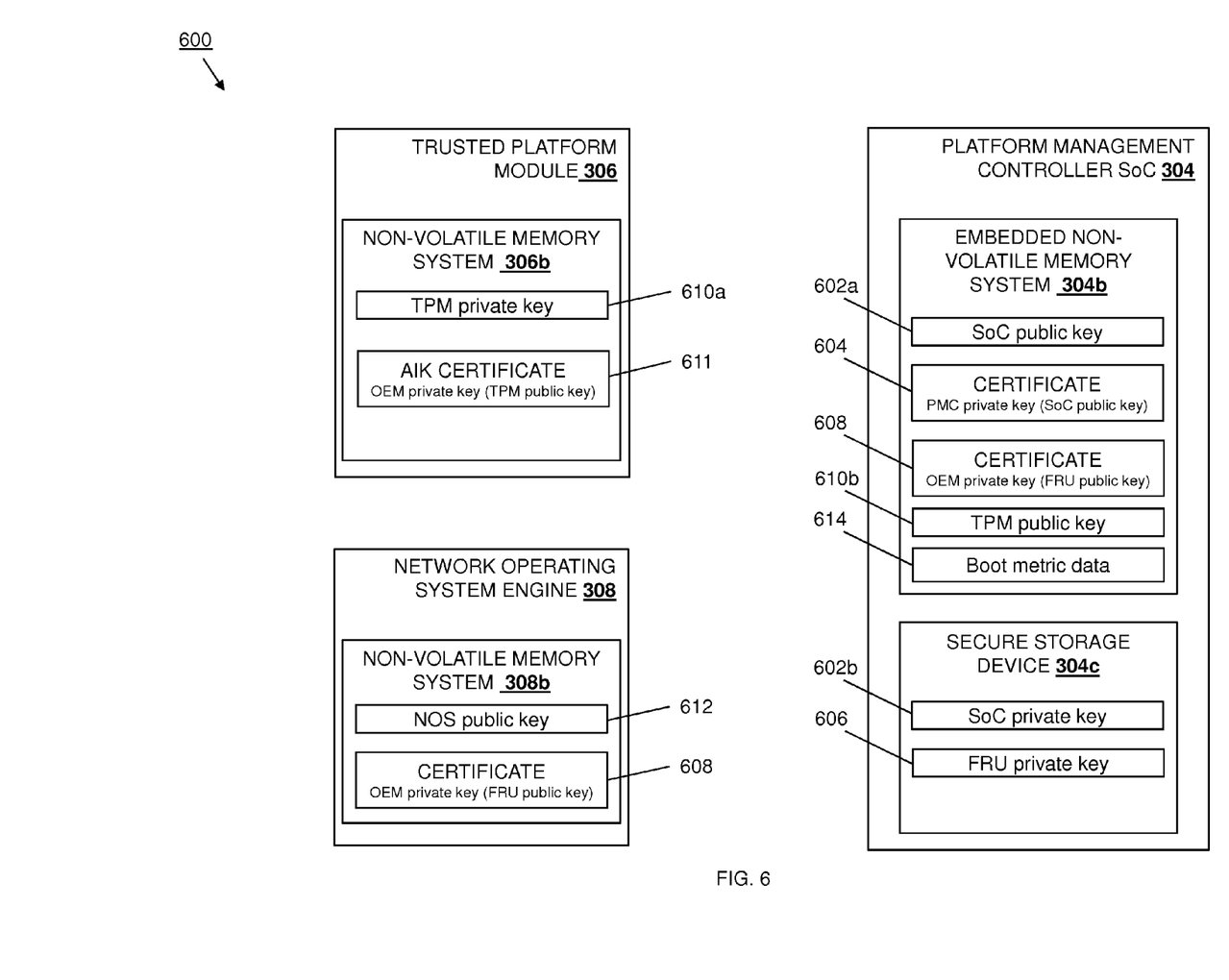
FIG. 6 is a schematic view illustrating an embodiment of authentication information provided in the field replaceable unit device of FIG. 3.

Referring to FIGS. 5 and 6, the method 500 begins at block 502 where authentication information is provided in an FRU device. In an embodiment, as discussed below, a variety of authentication information may be provided in the different components of an FRU device by one or more entities in order to provide for authentication of hardware discussed below as occurring during the method 500, as well as authentication of hardware that occurs outside of the method 500 (e.g., before and/or after the performance of the method 500). FIG. 6 illustrates an authentication information diagram 600 that illustrates some of the authentication information that may be provided in the components of the FRU device 300. For example, as discussed above, a vendor of the platform management controller SoC 304 may create and inject an SoC public key 602 into the embedded non-volatile memory system 304b of the platform management controller SoC 304, and an SoC private key 602b in the secure storage device 304c of the platform management controller SoC 304, where the pair of the SoC public key 602a and the SoC private key 602b is unique to the platform management controller SoC 304b. Also as discussed above, the vendor of the platform management controller SoC 304 may sign the SoC public key 602a with a PMC private key to create a certificate 604 (e.g., a X.509 (PMC private key {SoC public key}) certificate) that is stored in the embedded non-volatile memory system 304b of the platform management controller SoC 304 and that may be used (e.g., by the OEM) to verify that the platform management controller SoC 304 is manufactured/provided by a particular platform management controller SoC vendor.

The OEM may then integrate the platform management controller SoC 304 into the FRU device 300. In an embodiment, during manufacture of the FRU device 300, the OEM may generate and store a public key for the FRU device 300 ("FRU public key") in a storage device accessible to the OEM, and generate a private key for the FRU device 300 ("FRU private key 606") that is paired with the FRU public key, and store the FRU private key 606 in the secure storage device 304c of the platform management controller SoC 304. For example, the pair of the FRU public key and the FRU private key 606 may be generated internally by the FRU device 300 based on the physically uncloneable function (PUF) of the platform management controller SoC 304. As such, the pair of the FRU public key and FRU private key 606 is independent of the pair of the SoC public key 602a and SoC private key 602b and may be considered from the OEMs perspective as a root key pair independent of the platform management controller SoC 304 and unique to the FRU device 300.

The OEM may also sign the FRU public key with a private key of the OEM ("OEM private key") to create a certificate 608 (e.g., a X.509 (OEM private key {FRU public key}) certificate) that is stored in the embedded non-volatile memory system 304b of the platform management controller SoC 304 and the memory system 308b of the network operating system engine 308. The OEM may also generate unique attestation identification keys from the host processing system 308a in the network operating system engine 308 that are based on the trusted platform module 306. For example, a trusted platform module private key ("TPM private key 610a") may be created within the trusted platform module 306 and stored in the memory system 306b of the trusted platform module 306, while a corresponding trusted platform module public key ("TPM public key 610b") that is paired with TPM public key 610a may be created within the trusted platform module 306 and stored in the embedded non-volatile memory system 304b of the platform management controller SoC 304 (e.g., by the OEM). In addition, the trusted platform module 306 may include an encrypted trusted platform module certificate 611 ("AIK certificate (OEM private key {TPM public key})") that may be generated at the instruction of the OEM and utilized to verify that the trusted platform module 306 is authentic.

The provider of the network operating system (e.g., the OEM, a network operating system vendor, the customer, etc.) may generate a network operating system private key ("NOS private key") and a network operating system public key ("NOS public key 612") that is paired with the NOS private key and stored in the memory system 308b of the networking operating system engine 308. The pair of the NOS private key and NOS public key 612 may be used to sign the network operating system image so that the network operating system may be trusted during a boot process by the booting subsystem 3120 (e.g., a BIOS and a ONIE boot loader) when the host processing system 308a in the network operating system engine 308 performs a conventional secure boot operation. In embodiments where the provider of the network operating system is different from the OEM, it is noted that the provider of the network operating system does not have to share the NOS private key with the OEM.

Figure 7:
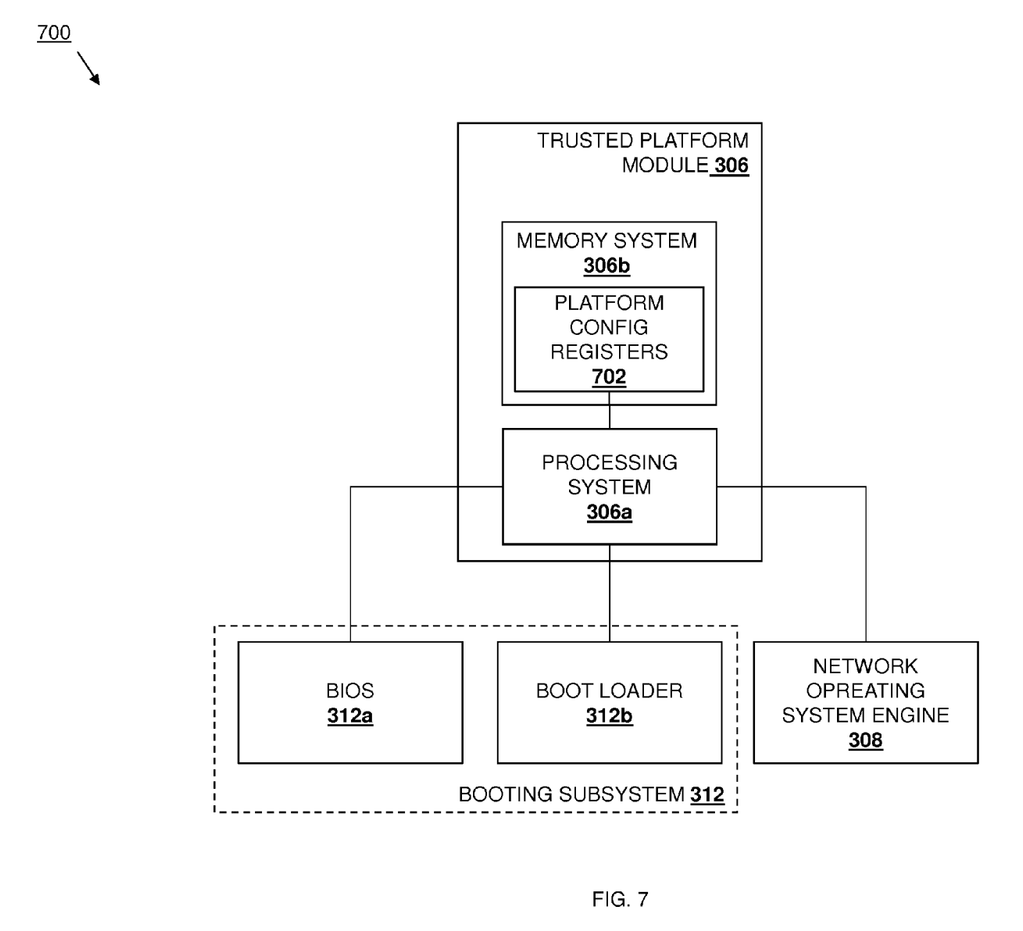
FIG. 7 is a schematic view illustrating an embodiment of the generation of boot metric data included in the authentication information of FIG. 6.

Referring now to FIG. 7, the provider of the network operating system may conduct a boot process 700 involving the network operating system engine 308, and record boot metric data 614 for provision in the embedded non-volatile memory system 304b in the platform management controller SoC 304. For example, the provider of the network operating system may conduct a boot process involving the booting subsystem 312 (e.g., a BIOS 312a and a boot loader 312b in the illustrated embodiment) and the network operating system engine 308, and measure the platform configuration register data ("PCR data") provided by the BIOS 312a, the boot loader 312b, and then the networking operating system engine 308 during that boot process in platform configuration registers 702 in the memory system 306b of the trusted platform module 306. The provider of the network operating system may then cause the PCR data to be signed with the TPM private key 610a and encrypt the result to provide boot metric data 614 that is stored in the embedded non-volatile memory system 304b of the platform management controller SoC 304. The platform management controller SoC 304 may also receive the (decrypted) PCR data signed with the TPM public key 610b and store it as the boot metric data 614. In a specific example, the network operating system provider may obtain the PCR data using the Redfish standard as published by the Distributed Management Task Force (DMTF) and that PCR data may be store as the boot metric data 614 discussed above. In such an example, the PCR data may be signed with the TPM private key 610a as part of the TPM attestation process discussed below in which the trusted platform module 306 generates the AIK certificate and signed the PCR data using that AIK certificate.

Thus, the authentication information diagram 600 provides an embodiment of the authentication information that may be provided with the components of the FRU device 300 prior to the provisioning of the FRU device 300 to a user. However, one of skill in the art in possession of the present disclosure will recognize that other types of authentication information may be provided in different components of FRU devices to provide the functionality discussed below while remaining within the scope of the present disclosure. Subsequent to block 502 of the method 500, the FRU device 300 may be provided to a user and operated as discussed below.

The method 500 then proceeds to block 504 where the network operating system performs a boot process and current boot metric data is provided to the trusted platform module. In an embodiment, the FRU device 300 may be powered up, reset, and/or otherwise initialized and, in response the platform management controller SoC 304 receives power and provides power to the host processing system 308a in the network operating system engine 308 to initialize the network operating system. In some examples, the platform management controller SoC 304 may start a timer for network operating system attestation completion that provides for a maximum time for the attestation of the network operating system before the platform management controller SoC 304 aborts the authentication process and powers down. In response to receiving power, the host processing system 308a in the network operating system engine 308 operates with the booting subsystem 312 to perform a conventional secure boot process. In an embodiment, similarly as discussed above with reference to FIG. 7, the BIOS 312a, the boot loader 312b, and then the network operating system engine 308 operate to perform the conventional secure boot process and, during that process, generate and provide current boot metric data into the platform configuration registers 702 in the memory system 306b of the trusted platform module 306. Current boot metric data may include measurements such as has values of images, magic numbers, application specific data, combinations thereof, and/or other boot metric data known in the art that may be recorded into the PCRs in a process called PCR Extends. When the conventional secure boot process is completed, the network operating system engine 308 indicates that the boot process is complete to the platform management controller SoC 304.

Figure 8:
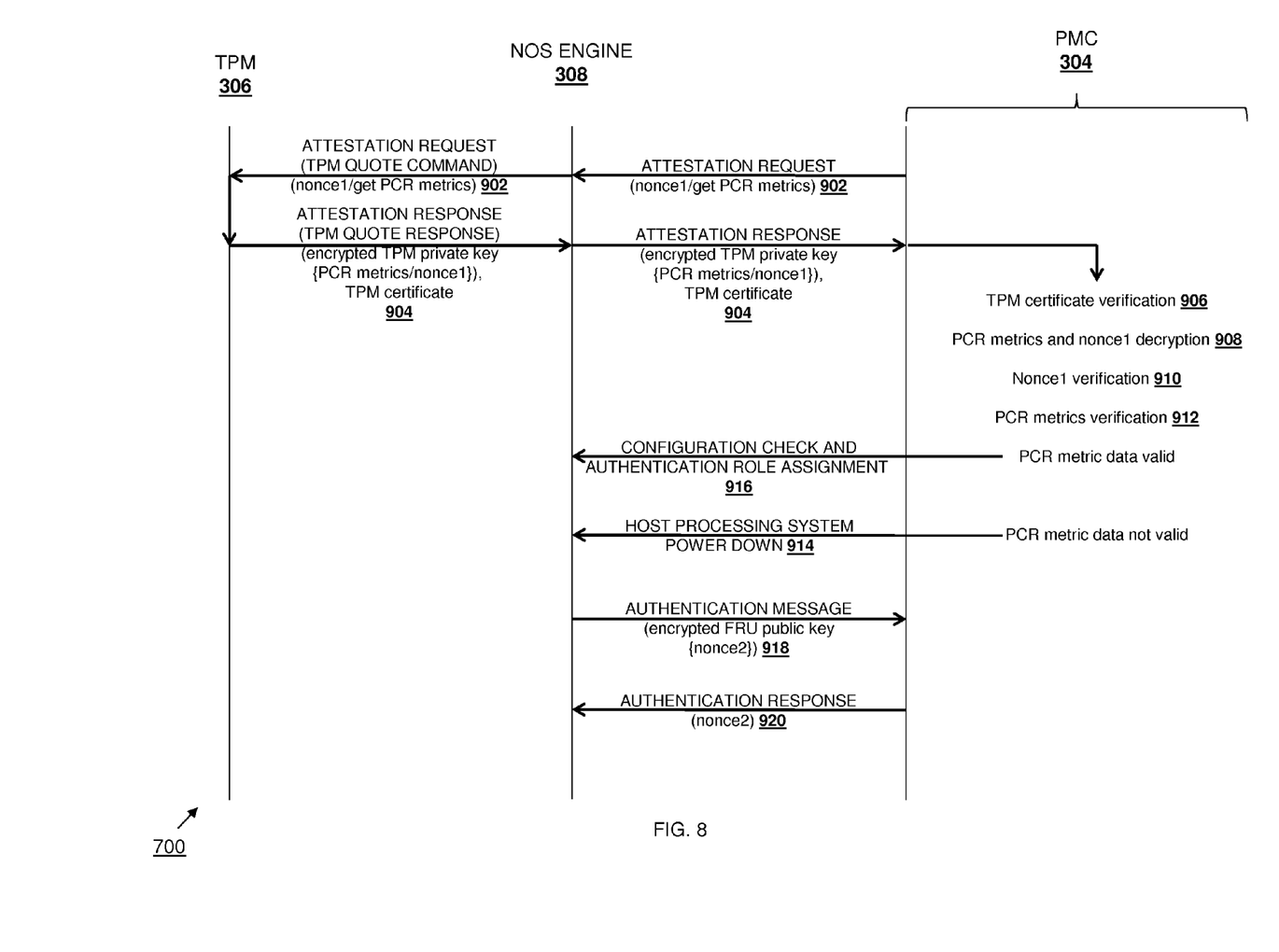
FIG. 8 is a flow diagram illustrating an embodiment of the communications and actions of components of the field replaceable unit device of FIG. 3 during the method of FIG. 5.

Referring now to FIGS. 5 and 8, the method 500 may then proceed to block 506 where the platform management controller SoC receives current boot metric data attested by the trusted platform module. In an embodiment of block 506, in response to determining that the boot process has been completed, the platform management controller SoC 304 may request network operating system engine attestation. For example, FIG. 8 includes a communication flow diagram 900 that illustrates the communications between the components of the FRU device 300 during the method 500. As illustrated, at block 506 the platform management controller 304 (e.g., via the embedded processing system 304a) may send an attestation request 902 through the network operating system engine 308 (e.g., via the host processing system 308a) to the trusted platform module 306 (e.g., via the processing system 306a) In an example, the attestation request 902 may include a first nonce ("nonce1") and a request to retrieve current boot metric data from the platform configuration registers 702 in the memory system 306b of the trusted platform module 306. In response to receiving the attestation request 902, the processing system 306a in the trusted platform module 306 retrieves the current boot metric data from the platform configuration registers 702 in the memory system 306b, signs the current boot metric data and the nonce1 with the TPM private key 610a to encrypt the signed current boot metric data/nonce1 ("encrypted TPM private key {PCR metrics/nonce1}"), and sends the encrypted TPM private key {PCR metrics/nonce1} along with the trusted platform module certificate 611 as an attestation response 904 through the network operating system engine 308 (e.g., via the host processing system 308a) to the platform management controller 304 (e.g., via the embedded processing system 304a).

The method 500 then proceeds to decision block 508 where the platform management controller SoC determines whether the current boot metric data is valid. As illustrated in FIG. 8, the platform management controller SoC 304 may perform a variety of actions to determine whether the current boot metric data is valid at decision block 508. For example, the embedded processing system 304a in the platform management controller SoC 304 may receive the trusted platform module certificate 611 and perform TPM certificate verification 906 by decrypting the trusted platform module certificate 611 (e.g., the AIK certificate) and analyzing the data in the decrypted TPM certificate to determine whether the trusted platform module 306 has been compromised using methods known in the art. If the TPM certificate is not verified at decision block 508, the platform management controller SoC 304 may determine that the current boot metric data is not valid and the method 500 may proceed to block 510, where the platform management controller SoC 304 ceases providing power to the network operating system engine. In an embodiment of block 510, the embedded processing system 304a in the platform management controller SoC 304 may perform a host processing system power down 914 and cease the provisioning of power through at least one of the power connections 310 to the host processing system 308a in the network operating system engine 308.

If the TPM certificate is verified at decision block 508, the platform management controller SoC 304 may perform additional actions to determine whether the current boot metric data is valid at decision block 508. For example, the embedded processing system 304a in the platform management controller SoC 304 may perform PCR metrics and nonce 1 decryption 908 by decrypting the encrypted current boot metric data/nonce1 (e.g., the encrypted TPM private key {PCR metrics/nonce1}) using the TPM public key derived from the AIK certificate to retrieve the current boot metric data and the nonce 1. The embedded processing system 304a in the platform management controller SoC 304 may then perform nonce1 verification 910 to determine whether the nonce1 received in the attestation response 904 matches the nonce1 sent in the attestation request 902. If the nonce1 is not verified (i.e., the nonce1 received by the platform management controller SoC 304 is different than the nonce1 sent by the platform management controller SoC 304) at decision block 508, the platform management controller SoC 304 may determine that the current boot metric data is not valid and the method 500 may proceed to block 510, discussed above. If the nonce1 is verified at decision block 508, the platform management controller SoC 304 may perform PCR metric data verification 912 to determine whether the current boot metric data received in the attestation response 904 matches the previously stored (i.e., as per block 502 of the method 500) boot metric data 614 in the embedded non-volatile memory system 304b. If the current boot metric data is not verified (i.e., the current boot metric data received by the platform management controller SoC 304 is different than the previously stored boot metric data 614 in the embedded non-volatile memory system 304b) at decision block 508, the platform management controller SoC 304 may determine that the current boot metric data is not valid and the method 500 may proceed to block 510, discussed above.

If the current boot metric data is verified at decision block 508, the platform management controller SoC 304 may determine that the current boot metric data is valid and the method 500 proceeds to block 512 where the platform management controller SoC authenticates the network operating system engine 308 and assigns authentication role(s). In an embodiment, at block 512, the embedded processing system 304a in the platform management controller SoC 304 may determine that the current boot metric data generated (at least in part) by the network operating system engine 308 is valid and, in response, authenticate the network operating system engine 308 as providing an authorized network operating system. In response, the embedded processing system 304a in the platform management controller SoC 304 may perform a configuration check and an authentication role assignment 916 where the embedded processing system 304a checks the configuration of the network operating system engine 308 and assigns one or more authentication roles that may be subsequently performed by the network operating system engine 308. In an embodiment, authentication roles assigned to the network operating system engine 308 may include assignment as an authentication server and/or authenticator/supplicant for downstream devices, and/or a variety of other authentication roles known in the art The method 600 then proceeds to block 514 where the network operating system engine sends an authentication message to the platform management controller SoC. Subsequent to the authentication of the network operating system engine 308 by the platform management controller SoC 304, the network operation system engine 308 may perform an authentication process on the platform management controller SoC 304 to provide "mutual authentication"

in the FRU device 300. In an embodiment, the host processing system 308a in the network operating system engine 308 sends an authentication message 918 to the embedded processing system 304a in the platform management controller SoC 304. For example, the authentication message 918 may include a second nonce ("nonce2") signed with the FRU public key ("encrypted FRU public key {nonce2}"). The method 500 then proceeds to decision block 516 where the network operating system engine 308 determines whether a valid authentication response has been received. The platform management controller SoC 304 receives the encrypted FRU public key {nonce2} and may use the FRU private key 606 in the secure storage device 304c to decrypt the authentication message 706 and retrieve the nonce2. The embedded processing system 304a in the platform management controller SoC 304 may then return the nonce2 to the host processing system 308a in the network operating system engine 308 in an authentication response 920. If the nonce2 received by the network operating system engine 308 in the authentication response 920 does not match the nonce2 sent in the authentication message 918, the method 500 proceeds to block 518 where the network operating system engine 308 determines that the platform management controller SoC 304 is not authentic/authorized and shuts down or otherwise ceases communication and/or operation with the platform management controller SoC 304.

If the nonce2 received by the network operating system engine 308 in the authentication response 920 matches the nonce2 sent in the authentication message 918, the method 500 proceeds to block 520 where the network operating system engine 308 authenticates the platform management controller SoC 304, and may subsequently authenticate downstream devices coupled to the FRU device 300. In an embodiment, subsequent to the mutual authentication of the platform management controller SoC 304 and the network operating system engine 308, the network operating system engine 308 may begin acting as an $802.1X^{HW}$ authenticator. For example, at block 520 the network operating system engine in a second FRU device may begin acting as a supplicant to an upstream port on the FRU device 300 (i.e., similarly to a centralized authentication server in conventional 802.1X authentication) using EAP-TLS with the FRU public/private key pair to perform hardware authentication and create a secured hardware network of devices.

In one embodiment, with reference to FIG. 4, subsequent to the mutual authentication performed according to the method 500, a network operating system engine in the route processor module 408 may be coupled to the line module 406b (e.g., by connecting the line module 406b to the switch device 402), and the network operating system engine in the route processing module 408 may authenticate the line module 406b using FRU public/private keys as per the supplicant/authenticator model with the route processor module acting as the authenticator and the line module acting as the supplicant. For example, the network operating system engine in the route processing module 408 may receive a line module public key (i.e., an FRU public key) from the line module 406b and validate that line module public key using an OEM certificate. The network operating system engine in the route processing module 408 may then encrypt a nonce with the FRU public key and send that encrypted nonce to the line module 506b. If the line module 406b is able to decrypt that encrypted nonce with the FRU private key that is paired with the FRU public key and send the correct nonce back to the network operating system engine in the route processing module 408, the line module 406b is verified/authenticated by the route processing module 408. The route processor module 408 may then verify/authenticate other devices that are coupled to the line module 406b (e.g., the port extender device 408, the transceiver device 410, etc.) in the same manner. One of skill in the art in possession of the present disclosure will recognize that in such an example, the line module 406b has internally undergone the $802.1X^{HW}$ authentication between its network operating system and platform management controller discussed above, as otherwise its network operating system may not act as a valid supplicant. As such, if its network operating system is spurious, the authentication with the router processor module 408 will fail.

Thus, systems and methods have been described that provide inline authentication of hardware devices and components that eliminates the need for external authentication services that require configuration and management by a network administrator. Rather, hardware devices such as FRU devices may be provided that are self-authenticating in order to provide an inline 802.1AR service/certification authority for hardware authentication based on a secure network operating system that does not require external servers, dongles, and/or access to eternal certification authorities. The systems and methods of the present disclosure provide a convenient mechanism to open up ports, features, and data usage of an FRU device for licensing purposes. For example, only a subset of ports/PHYs on the FRU device may be enabled based on licensing scenarios, while allowing the remaining ports/PHYs to be turned off or otherwise made inaccessible. Furthermore, trial versions of an FRU device may be provided with the platform management controller monitoring the specific and/or aggregate link utilization on a per-port basis in order to switch off the network processing unit after that link utilization reaches a threshold. In addition, the systems and methods of the present disclosure allow for the co-existence of authenticated and unauthenticated device trees within a network, with the possibility of applications that can determine the extent of data flow between the authenticated and unauthenticated devices. These and other advantages will be apparent to one of skill in the art in possession of the present disclosure.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A field replaceable unit authentication system, comprising:
   a chassis;
   at least one connector located in the chassis; and
   a field replaceable unit device located in the chassis and coupled to the at least one connector, wherein the field replaceable unit device includes:
      a trusted platform module;
      a network operating system engine that is coupled to the trusted platform module and that is configured to participate in a boot process that generates current boot metric data that is provided for storage in the trusted platform module; and
      a platform management controller that is coupled to the trusted platform module and the network operating system engine, wherein the platform management controller is configured to retrieve the current boot metric data from the trusted platform module, authenticate the trusted platform module, and compare the current boot metric data to previously stored boot metric data to determine whether to authenticate the network operating system engine.

2. The field replaceable unit authentication system of claim 1, wherein the platform management controller is configured, in response to determining to authenticate the network operating system engine, to assign at least one authentication role to the network operating system engine.

3. The field replaceable unit authentication system of claim 1, wherein the platform management controller is configured, in response to determining to not authenticate the network operating system engine, to cease providing power to the network operating system engine.

4. The field replaceable unit authentication system of claim 1, wherein the network operating system engine is configured, in response to being authenticated by the platform management controller, to authenticate the platform management controller.

5. The field replaceable unit authentication system of claim 4, wherein the network operating system is configured, in response to being authenticated by the platform management controller and authenticating the platform management controller, to determine that a device has been coupled to the field replaceable unit device through the at least one connector and, in response, authenticate the device.

6. The field replaceable unit authentication system of claim 4, wherein the authentication of the platform management controller by the network operating system engine includes the network operating system engine sending the platform management controller an authentication message that is encrypted with a field replaceable unit public key for the field replaceable unit device, and the platform management controller decrypting the authentication message with a field replaceable unit private key for the field replaceable unit device.

7. The field replaceable unit authentication system of claim 1, wherein the trusted platform module is configured to encrypt the current boot metric data with a trusted platform module private key to provide encrypted current boot metric data, and wherein the platform management controller is configured to decrypt the encrypted current boot metric data with a trusted platform module public key.

8. An information handling system (IHS), comprising:
a booting subsystem;
a trusted platform module that is coupled to the booting subsystem and that is configured to couple to a network operating system engine, wherein the trusted platform module is configured to receive and store current boot metric data that is generated when the booting subsystem and the network operating system engine perform a boot process; and
a platform management controller that is coupled to the trusted platform module, wherein the platform management controller is configured to retrieve the current boot metric data from the trusted platform module in response to the booting subsystem and the network operating system engine performing the boot process, authenticate the trusted platform module, and compare the current boot metric data to previously stored boot metric data to determine whether to authenticate the network operating system engine.

9. The IHS of claim 8, wherein the platform management controller is configured, in response to determining to authenticate the network operating system engine, to assign at least one authentication role to the network operating system engine.

10. The IHS of claim 8, wherein the platform management controller is configured, in response to determining to not authenticate the network operating system engine, to cease providing power to the network operating system engine.

11. The IHS of claim 8, wherein the platform management controller is configured, following a determination to authenticate the network operating system engine, to receive an authentication message from the network operating system engine and, in response, provide an authentication response to the network operating system engine.

12. The IHS of claim 8, wherein the trusted platform module is configured to encrypt the current boot metric data with a trusted platform module private key to provide encrypted current boot metric data, and wherein the platform management controller is configured to decrypt the encrypted current boot metric data with a trusted platform module public key.

13. The IHS of claim 8, wherein the booting subsystem includes a Basic Input/Output System (BIOS) and a boot loader.

14. A method for authentication in a field replaceable unit, comprising:
performing a boot process in a field replaceable unit device;
generating current boot metric data during the performance of the boot process;
storing, in a trusted platform module in the field replaceable unit device, the current boot metric data;
retrieving, by a platform management controller in the field replaceable unit device from the trusted platform module, the current boot metric data;
authenticating, by the platform management controller, the trusted platform module; and
comparing, by the platform management controller, the current boot metric data to previously stored boot metric data to determine whether to authenticate a network operating system engine that participated in the performance of the boot process.

15. The method of claim 14, further comprising:
assigning, by the platform management controller in response to determining to authenticate the network operating system engine, at least one authentication role to the network operating system engine.

16. The method of claim 14, further comprising:
ceasing, by the platform management controller in response to determining to not authenticate the network operating system engine, the provisioning of power to the network operating system engine.

17. The method of claim 14, further comprising:
authenticating, by the network operating system engine in response to being authenticated by the platform management controller, the platform management controller.

18. The method of claim 17, further comprising:
determining, by the network operating system engine in response to being authenticated by the platform management controller and authenticating the platform management controller, that a device has been coupled to the field replaceable unit device; and
authenticating, by the network operating system engine, the device.

19. The method of claim 17, wherein the authentication of the platform management controller by the network operating system engine includes:

sending, by the network operating system engine to the platform management controller, an authentication message that is encrypted with a field replaceable unit public key for the field replaceable unit device; and decrypting, by the platform management controller, the authentication message with a field replaceable unit private key for the field replaceable unit device.

20. The method of claim 14, further comprising:

encrypting, by the trusted platform module, the current boot metric data with a trusted platform module private key to provide encrypted current boot metric data; and decrypting, by the platform management controller, the encrypted current boot metric data with a trusted platform module public key.

* * * * *